(12) United States Patent
Hoeijmakers (10) Patent No.: US 9,018,863 B2
(45) Date of Patent: Apr. 28, 2015

(54) ROTATING ELECTROMECHANICAL CONVERTER

(75) Inventor: Martin Jacobus Hoeijmakers, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 220 days.

(21) Appl. No.: 13/813,582

(22) PCT Filed: Jul. 25, 2011

(86) PCT No.: PCT/NL2011/000055
§ 371 (c)(1),
(2), (4) Date: Jan. 31, 2013

(87) PCT Pub. No.: WO2012/018253
PCT Pub. Date: Feb. 9, 2012

(65) Prior Publication Data
US 2013/0127378 A1 May 23, 2013

(30) Foreign Application Priority Data
Aug. 5, 2010 (NL) .................................... 1038151

(51) Int. Cl.
*H02P 5/46* (2006.01)
*H02P 17/00* (2006.01)
(Continued)

(52) U.S. Cl.
CPC . *H02P 17/00* (2013.01); *B60K 6/26* (2013.01); *B60K 6/448* (2013.01); *H02K 21/04* (2013.01); *H02K 51/00* (2013.01); *Y02T 10/6243* (2013.01); *B60K 2006/262* (2013.01)

(58) Field of Classification Search
USPC ........ 318/79, 400.41, 487, 491, 505, 520, 50; 310/49.32, 49.37, 49.39, 49.41, 103, 310/106, 112, 113, 114
See application file for complete search history.

(56) References Cited

U.S. PATENT DOCUMENTS 3,683,249 A * 8/1972 Shibata et al. ................. 318/730
5,804,934 A * 9/1998 Yamada et al. .................. 318/77
(Continued)

FOREIGN PATENT DOCUMENTS

CN 1572052 A 1/2005
CN 2845305 Y 12/2006
(Continued)

OTHER PUBLICATIONS

Aydin et al. (2004) "Axial Flux Permanent Magnet Disc Machines: A Review;" SPEEDAM; pp. 61-71.
(Continued)

*Primary Examiner* — Bentsu Ro
*Assistant Examiner* — Thai Dinh
(74) *Attorney, Agent, or Firm* — Swanson & Bratschun, L.L.C.

(57) ABSTRACT

Starting from the known rotating electromechanical converter comprising a stator with magnetic circuits and polyphase energizing windings, a first, inner, rotor with magnetic circuits and polyphase energizing windings, and a second (inter)rotor between this first rotor and the stator, provided with permanent magnetic members for co-operation with the magnetic circuit of at least the stator, the invention proposes to provide means for modifying the state of magnetization of at least a part of the respective areas of the second rotor which each lie between two successive permanent magnetic members.

10 Claims, 10 Drawing Sheets

(51) Int. Cl.
*B60K 6/26* (2007.10)
*B60K 6/448* (2007.10)
*H02K 21/04* (2006.01)
*H02K 51/00* (2006.01)

(56) References Cited

U.S. PATENT DOCUMENTS

| 6,380,653 | B1 * | 4/2002 | Seguchi | 310/112 |
| 6,768,237 | B1 * | 7/2004 | Schroedl | 310/114 |
| 6,794,781 | B2 * | 9/2004 | Razzell et al. | 310/114 |
| 7,164,219 | B2 | 1/2007 | Hoeijmakers | |
| 7,466,053 | B1 * | 12/2008 | Radev | 310/114 |
| 2006/0038454 | A1 | 2/2006 | Bojiuc | |

FOREIGN PATENT DOCUMENTS

| EP | 1154551 | 11/2001 |
| EP | 2072320 | 6/2006 |
| WO | 0034066 | 6/2000 |
| WO | 03075437 | 9/2003 |
| WO | 2007107691 | 9/2007 |
| WO | 2010015299 | 2/2010 |

OTHER PUBLICATIONS

Hoeijmakers et al. (2006) "The Electric Variable Transmission;" IEEE Trans. Ind. Appl.; 42:1092-1100.

International Search Report for PCT/NL2011/000055; Oct. 14, 2011.

English Translation of the First Chinese Office Action for corresponding Chinese Application No. 201180042752 9 mailed Dec. 3, 2014.

* cited by examiner

ROTATING ELECTROMECHANICAL CONVERTER

RELATED APPLICATION DATA

The instant application is a national phase entry pursuant to 35 USC §371 of International Patent Application No. PCT/NL2011/000055, filed Jul. 25, 2011; which application claims priority to Netherlands Patent Application No. 1038151, filed Aug. 5, 2010; all of the foregoing applications are incorporated herein by reference in their entireties.

TECHNICAL FIELD

The invention relates to a rotating electromechanical converter of the kind as described in the preamble of the main claim.

BACKGROUND ART

Such a converter is known from WO 03/075437 (U.S. Pat. No. 7,164,219) which documents the most relevant prior art Applicant is aware of.

Although this publication describes in detail an embodiment of such a converter without permanent magnetic members it mentions in claim 4 an interrotor (the second rotor) which is provided on one surface with permanent magnetic material and on the other surface with slots accommodating an externally accessible control winding. Page 5 line 26-page 6 line 12 describes how this configuration should result in the creation of 'virtual magnet poles' on the rotor surface into which the slots open, which poles can be shifted in the circumferential direction of the interrotor under the influence of control currents in the winding. The purpose thereof is understood to try to influence that part of the magnetic flux generated by the permanent magnetic members which penetrates into the stator and this stator flux must be reduced when the converter operates at higher rotational speeds. Indeed reducing the magnetic flux in the stator of a rotating machine when same operates at higher rotational speeds is a measure which is known in itself for a very long time. The way in which this is brought about according to the above described proposal is, however, not very efficient while the rotor structure necessary for implementing this proposal has several drawbacks. WO 03/075437 also observes that for creating shiftable virtual magnet poles on the surface of the interrotor (thus no material poles and no salient poles) this rotor must have a substantial smooth surface which forbids the use of slots with a substantial dimension in the circumferential direction of the interrotor. Thus any windings must be accommodated in slots in the rotor body which are in connection with the interrotor surface via narrow entry slits with a width somewhat greater than the diameter of the wire as used for the winding. As a result the finally obtained windings, lying in these slots, will be very irregular with a small filling factor and cannot be very effective.

DISCLOSURE OF INVENTION

The invention aims to obviate these drawbacks and is based on the insight that advantages are obtained by controlling and modifying the paths and magnitudes of the magnetic flux as generated by the permanent magnets already in the body of the interrotor itself and in the parts of the interrotor material in the vicinity of the magnetic members and to control in this way the part of this flux which in fact reaches the stator.

The converter according to the invention is thus characterised by the measures of the main claim.

Claims 2 and 3 describe embodiments of this general idea.

It is observed that the magnetic flux generated by these means can also serve as a useful stator flux.

The measures as proposed by the invention ensure that in a simple way and without the need for a complicated rotor structure both the path and the magnitude of the magnetic flux in the stator can be controlled efficiently by a moderate control current and thus with minimal losses.

Possible embodiments of the electromechanical converter according to the invention in a radial-flux configuration are described in the claims 4-6.

The embodiment described in claim 4 is advantageous in vehicles in order to reduce the stator flux at a high speed of the second (outer) rotor, so that the stator iron losses and the stator voltage are limited.

The embodiment described in claim 5 especially offers the possibility to control the flux in the first (inner) rotor. This is advantageous in the case that a low output torque is required at a low speed of the second (outer) rotor. In that case the torque on the first rotor is also low, so that the flux in the first rotor may be reduced and the iron losses in the first rotor and the first-rotor voltage are limited. This kind of operation occurs in drive systems with a quadratic torque-speed characteristic such as in the propulsion system of vessels. The invention offers the possibility of an excellent speed control of vessels at low speeds, while at higher speeds a mechanical lock up between the first and the second rotor is used. This may be very useful in tug-boats and fire-boats.

Preferred embodiments of the electromechanical converter according to the invention in an axial-flux configuration are described in the claims 7 and 8.

Further preferred embodiments are described in the claims 9 and 10.

It is observed that electromechanical converters of the present kind, both in radial-flux and in axial-flux configuration, are known in itself from many publications. WO 00/34066 (AB ABB) for instance describes an electromechanical converter in both radial-flux and axial-flux configuration having permanent magnets for generating the magnetic fluxes necessary for operating the machine without, however, disclosing any way in which the permanent magnetic flux in the stator can be controlled. (It is, however, known from practice that AB ABB uses the windings in the stator structure for that purpose.)

The article 'Axial Flux Permanent Magnet Disc Machines: A Review' by M. Aydin, S. Huang and T. A. Lipo gives an excellent overview of Axial-flux Machines as such with an extensive list of relevant literature.

Furthermore the article: 'The Electric Variable Transmission' by M. J. Hoeijmakers (the present inventor) and J. A. Ferreira in IEEE Transactions on Industry Applications, July/August 2006, gives a clear overview of the theoretical background of electromechanical convertors such as the one according to the present invention.

Both WO 2007/107691 and WO 2010/015299 describe a kind of magnetic gearbox with variable gear ratio comprising a first, rotating, ring-shaped outer member, provided with permanent magnets, a second, rotating ring-shaped inner member, also provided with permanent magnets and inbetween these a sleeve-shaped third member having radial interpoles to modulate the radially directed interactive magnetic fields produced by the respective magnets. According to WO 2010/015299 the magnetic material of these interpoles can be driven into saturation to make them inactive. The specific measures proposed by the present invention are not known from, or obvious after, these disclosures.

The way in which the electromechanical converter according to the invention can be used, controlled, combined with a prime mover and provided with electrical energizing circuits is the same as described in the above-mentioned prior art and will thus not be discussed here. The following description, given while referring to the attached drawing, will deal exclusively with the way in which, according to the invention, the flux in the stator is controlled.

BRIEF DESCRIPTION OF DRAWINGS

The invention will be elucidated on the hand of the drawing. Herein show.

BEST MODE FOR CARRYING OUT THE INVENTION

Figure 1:
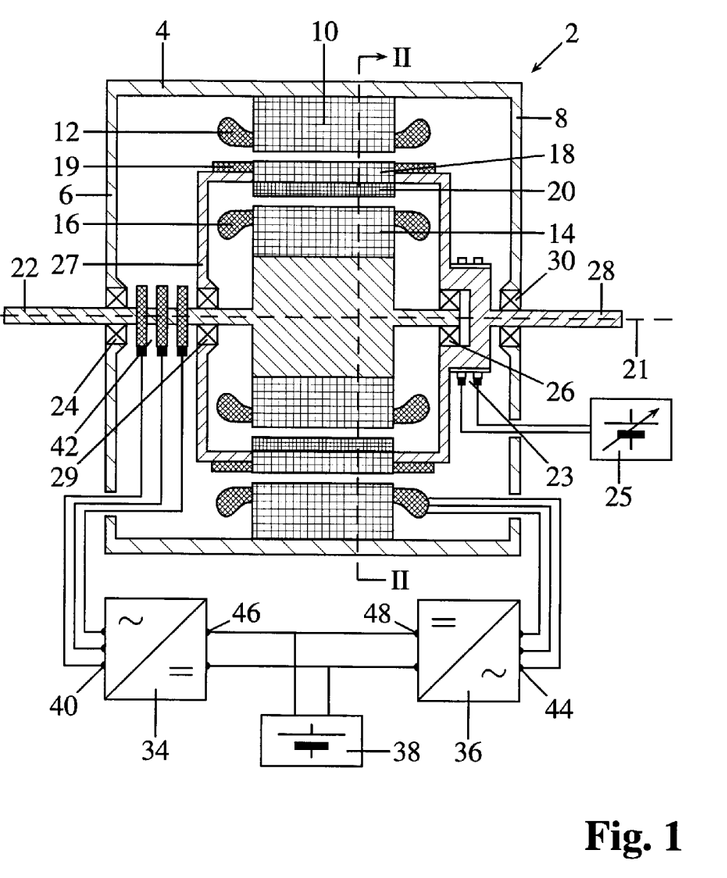
FIG. 1 schematically and in cross-section the general set-up of an electromechanical converter wherein the measures of the invention are incorporated.

FIG. 1 shows how the general configuration of an electromechanical converter in which the measures of the invention are incorporated comprises, in a radial configuration, a housing 2 with a cylindrical wall 4 and two cylindrical end walls 6, 8. To the inside of the cylindrical wall 4 is connected a stator 10 with its winding 12 and within the housing 2 are further accommodated a first rotor 14 with its polyphase winding 16 and, surrounding this, a second rotor 18 with at its radially inner surface, which is directed towards the first rotor 14, permanent magnetic members 20. This second rotor 18, which can also be indicated as the interrotor, carries a control winding 19 which is connected to the assembly of slip rings and brushes 23; this is, in turn, connected to a controllable DC source 25.

Both the first rotor 14 and the second rotor 18 can rotate around the common axis 21. The inner rotor 14 is connected to a shaft 22 which can be considered to be the input shaft of the electromechanical converter and this shaft is carried in bearings 24 and 26 respectively which are accommodated in respectively the end wall 6 of the main cylindrical housing 2 and the right-hand end wall of a mainly cylindrical auxiliary housing 27. This housing 27 carries at its cylindrical wall the second rotor 18 and is at the right-hand side connected to a radially extending shaft 28 with the same axis 21 and which can be considered to constitute the output shaft of the electromechanical converter. This shaft is supported in a bearing 30 in the end wall 8 of the main housing 2. The housing 27 is at the left-hand side supported in a bearing 29 on the shaft 22.

The above described parts co-operate with electrical power circuits comprising a first AC/DC converter 34 and a second AC/DC converter 36, both co-operating with a storage battery 38. The AC connections 40 of the converter 34 are shown in FIG. 1 to be connected to the assembly of brushes and slip rings 42 of which the slip rings are, in a manner known per se, connected to the three-phase exciting winding 16 of the first rotor 14; the AC terminals 44 of the converter 36 are connected, also as known in itself, to the three-phase energizing windings of the stator 12. The respective DC terminals 46 of the converter 34, and 48 of the converter 36, are interconnected and connected to the battery 38. Both the AC outputs 40 and 44 respectively can deliver an AC current with a frequency zero—thus, in fact, a DC current.

This, too, is in principle known from the prior art.

The FIGS. 3-6 show part cross-sections through the assembly comprising the stator 10, the interrotor 18 and the first rotor 14.

Figure 2:
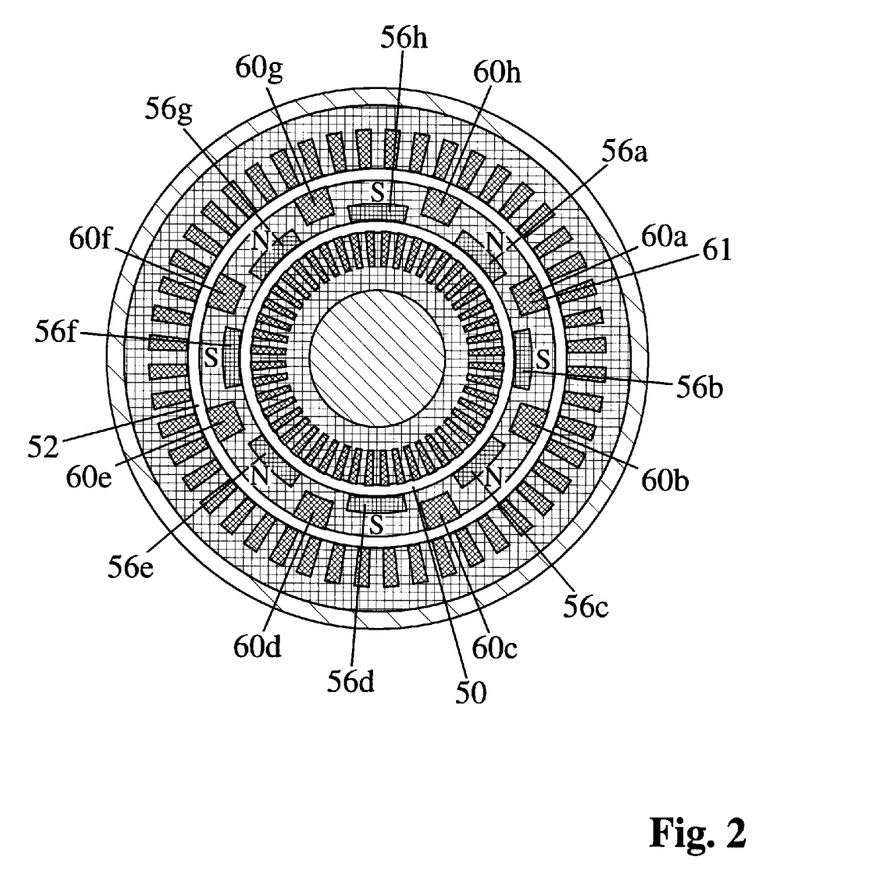
FIG. 2 a cross-section along the line II-II of this converter.
Figure 3:
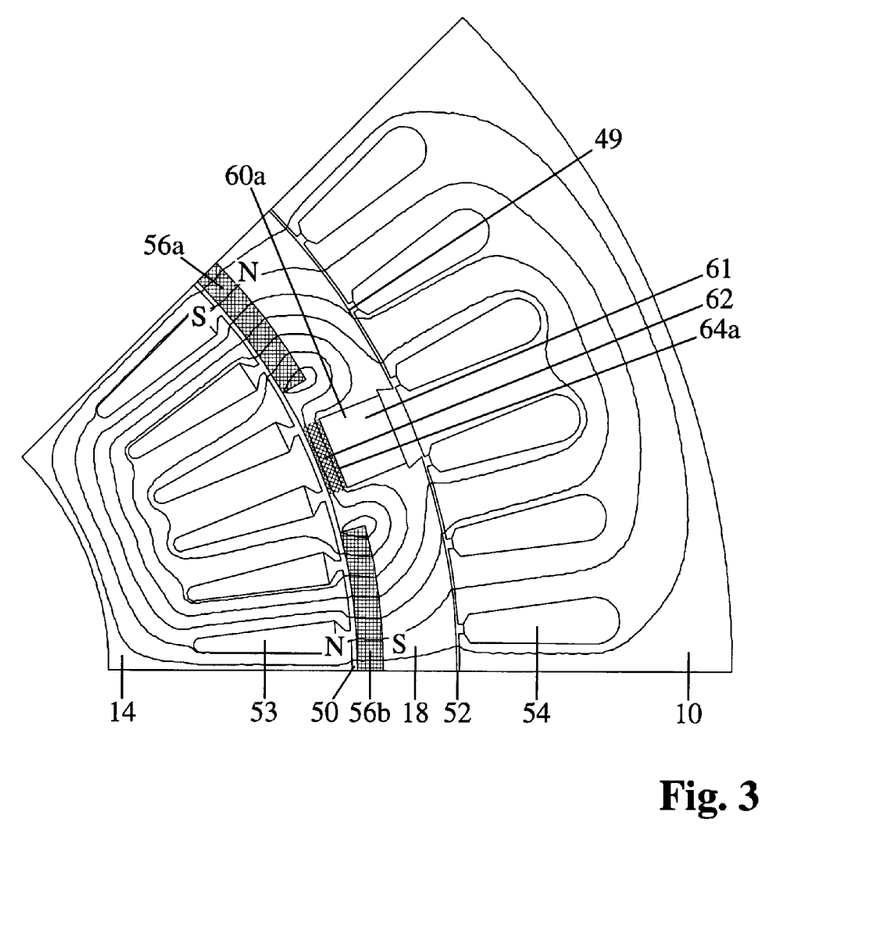
FIG. 3-6 mutually similar cross-sections of a part of a stator, an interrotor and a rotor of this embodiment with indicated therein the distribution of the flux lines in various operating stages, dependent upon the DC current in the winding of the second rotor.

The FIGS. 3-6 show a first air gap 52 between the stator 10 and the second rotor 18 which, in its turn, surrounds via a second air gap 50 the innermost first rotor 14. The first rotor 14, the second rotor 18 and the stator 10 have the well-known stacked laminated structure with in the first rotor 14 the slots 53 which accommodate the energizing winding 16 and in the stator the slots 54 which accommodate the energizing winding 12. The second, interrotor 18 carries a number of permanent magnetic members 56a . . . 56h which lie closely adjacent the air gap 52 (vide FIG. 2) and two thereof, indicated with 56a and 56b respectively, are shown in the FIG. 3-6. They are radially magnetised and the magnetic poles thereof alternate in the circumferential direction. For instance, for the permanent magnetic member 56a, a first magnetic polarity N is directed radially outwards (towards the stator 10) and the second polarity (S) is directed radially inwards (towards the first rotor 14); for the magnetic member 56b the situation is exactly opposite: here the second magnetic polarity (S) is directed radially outwards towards the stator 10 and the first magnetic polarity (N) is directed radially inwards (towards the first rotor 14). According to the invention the second rotor 18 comprises, distributed along the outer circumference 49 bounding the air gap 52, a number of radially inwardly directed slots, indicated with reference numeral 60a . . . 60h in FIGS. 2 and 7 of which one is shown in FIGS. 3-6 and denoted there with 60a. These slots 60a . . . 60h accommodate a control winding 61 which carries a DC current such that a magnetic flux is generated in the circumferential direction of the second rotor 18, which traverses the space 62 which is indicated by double hatching in FIG. 3, present between the bottom 64 of each slot 60 and the gap 50. It will be clear that the direction and the magnitude of the current through this control winding 61 control in a very large extent the magnetic state and the direction of the magnetic flux through these inter-zones 62.

Note that the entry (upper) opening of these slots can be relatively wide as it is not necessary that the surface 49 is a smooth surface so that it is possible to accommodate in the slots a neatly wound winding which has a high fill-factor (with consequently a high control efficiency) and to seal same in place with a suitable hardening resin. This is a big advantage over the way in which according to the prior art (as discussed in the Introduction) the winding is accommodated.

Preferably the field strength of the magnets 56a . . . 56h is such that a magnetic flux is generated between two adjacent magnets, such as the magnets 56a and 56b, which are separated by these controllable zones 62 that in the absence of any currents in the machine the magnetic material in this zone is saturated and thus shows a high reluctance. This is because the flux which emanates from the N pole of the magnet 56a is divided into two parts: a first part which flows through the stator 10 and a second part which flows through the zone 62.

As already stated in the Introduction the inventive idea is in fact the <channelling> and control of the flux emanating from the permanent magnets 56 by controlling the state of magnetisation of the narrow zones 62 which lie under the slots 60, and also the magnetic flux through these zones. In the shown embodiment this can be effected by means of a DC current which flows through the winding 61 in these slots 60: the magnetic field generated by this current is directed in the circumferential direction of the rotor 18 and can, dependent upon the direction of this current, be directed to the right or to the left and can thus either support, or counteract the flux generated by the magnets 56. When as shown of the magnet 56a the S pole lies near to the air gap 50 and of the magnet 56b the N pole lies near to the air gap then in the absence of any current through the control windings the flux in the zone 62 will flow to the right, from the N pole of the magnet 56a to the S pole of the magnet 56b.

There will also be flux which exits from the N pole of magnet 56a, crosses the air gap between the second rotor and the stator 10, then flows through the stator 10, crosses the air gap again and flows to the S pole of magnet 56b. It is this flux through the stator 10 which the invention aims to control, depending upon the operating conditions of the electromechanical converter.

Finally there is a flux part which flows from the N pole of the magnet 56b and which, while crossing the air gap 50 twice, flows via the first rotor 14 to the magnet 56a.

This part of the flux is practically not influenced by the state of the zone 62.

In the following will be described how the flux in the stator can be controlled by means of the control current in the winding which occupies the slots in the second rotor 18.

FIG. 3 shows the magnetic field lines for the situation in which all currents in all windings are zero. The shortest way for the flux from the north pole of permanent magnet 56a to the south pole of permanent magnet 56b is through the zone 62 which will be saturated. Hence, the magnetic reluctance of the zone 62 will be high and the larger part of the magnet flux will flow through the stator 10. This is a basic situation for operation with a normal speed of the second (inter)rotor which is connected to the output shaft 28.

Figure 4:
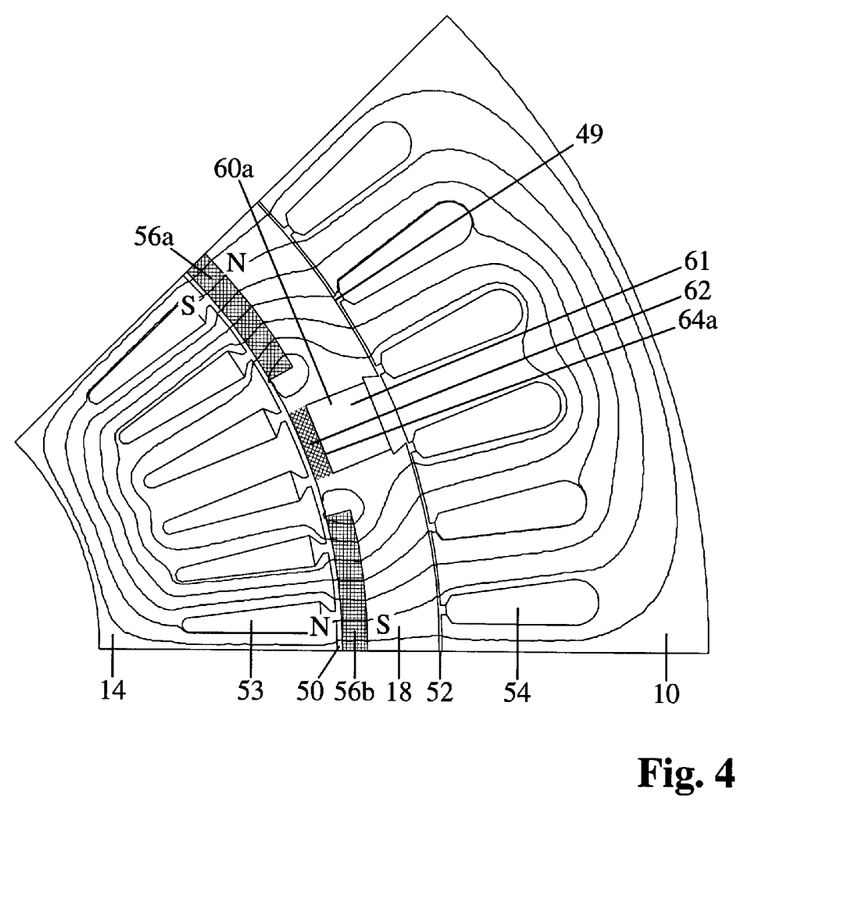

FIG. 4 shows a situation in which the currents in the stator and in the first rotor are zero. However, the DC current in the second-rotor winding 61 in the slots 60 has now such a value that the flux in the zone 62 is zero. As a result of this relatively low current, the magnetic reluctance of this zone is low. All flux from the north pole of magnet 56a to the south pole of magnet 56b flows through the stator 10. This is a basic situation for operation with a relatively low speed of the second (inter)rotor.

Figure 5:
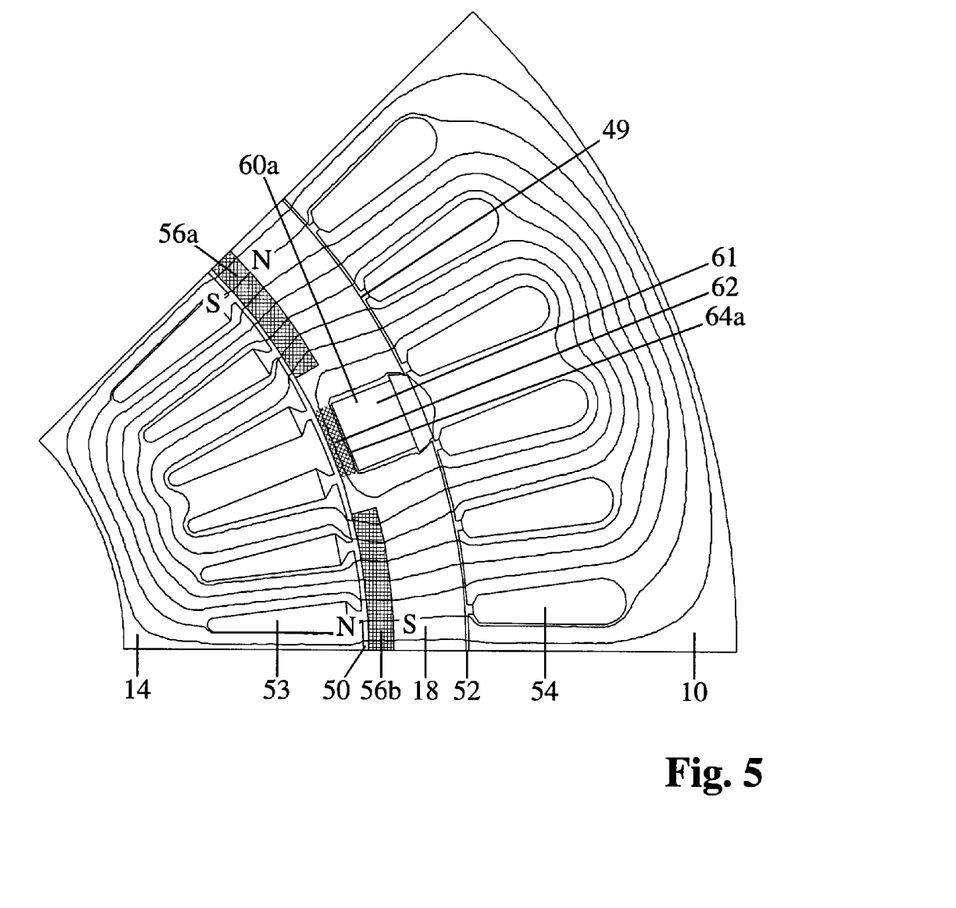

FIG. 5 shows a situation in which the currents in the stator and in the first rotor are zero again. However, the DC current in the second-rotor winding 61 in the slots 60 has such a value that the flux in the zone 62 is in the opposite direction compared to FIG. 3. In this case the DC current contributes to the flux through the stator, so that the stator flux is higher than in the case of FIG. 4 and also higher than the magnet flux. This is a basic situation for operation with a very low speed of the second (inter)rotor. Because of the high stator flux, the contributions of the stator currents to the torque on the second (inter)rotor are relatively high.

Figure 6:
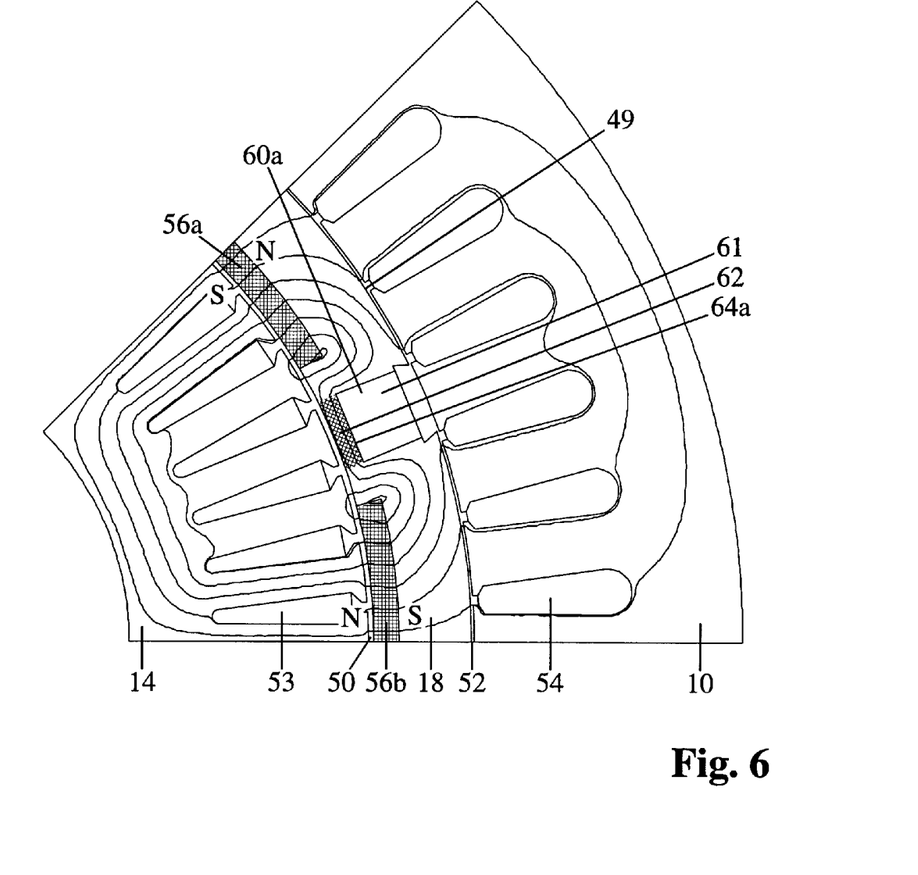

FIG. 6 shows a situation in which the DC current in the second-rotor winding 61 in the slots 60 is opposed to the DC current as in the situation of the FIGS. 4 and 5. The currents in the stator and in the first rotor are zero again. The flux from the north pole of permanent magnet 56a to the south pole of permanent magnet 56b through the zone 62 is in this case larger than in the case of FIG. 3. As a result, the saturation in the zone 62 is also higher than in the case of FIG. 3 and the flux through the stator 10 will be lower. In fact, we have a kind of active field weakening in the stator. This is a basic situation for operation with a very high speed of the second (inter)rotor and of the output shaft 28.

The present electromechanical converter can be used as a continuously variable transmission for automobiles, being combined with a rechargeable battery for recuperating energy when retarding the vehicle and also having the possibility of a pure electric drive. In connection therewith it is observed that the converter according to the prior art has, in principle, these functional possibilities too but the converter according to the invention has the advantage of lower operative losses and thus a better efficiency.

The first shaft 22, connected to the first rotor 14 is then the input shaft, being connected to the engine of the vehicle, for instance a diesel engine which runs throughout its operation with its nominal or most efficient speed for instance 1500 rpm. The second shaft 28 is the output shaft, being connected to the final drive of the vehicle. It is, of course, also possible that each tractive wheel of the vehicle is coupled to its own converter. This has no consequences for the various operative states of the mechanical converter.

It is observed that the electrical convertors 34 and 36 respectively, shown in FIG. 1, can convert a DC current into an AC current with variable frequency but this AC current can also have a frequency zero then being, in that case, in effect a DC current.

When starting the engine the shaft 22 is initially stationary. To keep the vehicle at standstill during the starting process, the polyphase winding 12 in the stator 10 is supplied by DC currents. Usually, the DC current in the second-rotor winding 19, may be zero. The polyphase winding 16 on the first rotor 14 is supplied by a set of polyphase currents the frequency of which increases from zero to a value corresponding with the starting speed of the engine. Next, fuel is supplied to the engine and the engine starts.

When the vehicle is to be driven off, the polyphase winding 16 on the first rotor 14 is supplied by a set of polyphase currents, the frequency of which is increased such that the shaft 22 is accelerated to the desired (optimal) engine speed, When the amount of injected fuel is also increased, the torque from the engine is directly transmitted from the first shaft 22 to the first rotor 14, via the magnetic field in the air gap 50, to the permanent magnets 20 on the second rotor 18 and to the second shaft 28.

Besides, electric energy is withdrawn from the polyphase winding 16 on the first rotor 14, via the sliprings and brushes 42 to the AC terminals 40 of the AC/DC converter 34. The resulting DC current flows from the DC terminals 46 to the DC terminals 48 of the DC/AC converter 36. This DC current may be boosted by a current from the battery 38.

The frequency of the polyphase currents from the AC terminals 44 of the DC/AC converter 36 is linked with the speed of the second shaft 28, for instance by means of a speed sensor. These polyphase currents from the AC terminals 44 are supplied to the windings 12 on the stator 10 and will result into a torque from the stator 10 on the second rotor 18 and the second shaft 28.

At a very low vehicle speed, the magnetic field in the stator 10 is increased by supplying the second-rotor control winding 19 with a relatively high DC current. Thus, the torque form the stator 10 on the second rotor 18 is also increased.

Because of the said direct torque from the first rotor 14 on the second rotor 18 and the torque from the stator 10 on the second rotor 18, the vehicle speed will increase. As a result, the frequency of the polyphase currents from the AC terminals 44 supplied to the windings 12 on the stator 10 will increase too.

During the acceleration, the desired maximum torque on the second shaft 28 decreases. For that reason, the magnetic field in the stator 10 may be decreased by decreasing the DC current in the second-rotor winding 19. This has a favourable influence on the iron losses in the stator 10 and the voltage level of the windings 12 on the stator 10.

When the desired vehicle speed has been reached, the load angle of the stator currents is reduced to such a value that the torque is maintained at the value to keep the vehicle speed constant.

When the vehicle speed is increased to such a value that the speed of the first shaft 22 equals the speed of the second shaft 28, we have the case of direct-drive. In that case the engine torque is fully transferred from the first rotor 14 to the second rotor 18, via the air gap 50. To transfer this torque, the rotor windings 16 of the first rotor 14 are supplied with DC currents. There is hardly any energy transfer (only some losses) via the DC terminals 46 of the AC/DC converter 34. There are no currents in the second-rotor winding 19 and the stator winding 12. In this case the total converter losses are minimal.

When the vehicle speed is further increased, while maintaining the engine speed, the converter is in over-drive. In this case, there is an electric energy flow from the stator winding 12, to the DC/AC converter 36, to the DC/AC converter 34, to the set of brushes and sliprings 42 and further to the rotor winding 16. Now, the stator 10 exerts a braking torque on the second rotor 14 (the torque on the second shaft 28 is smaller than the torque on the first shaft 22).

At such a relatively high vehicle speed, the stator is operated in a so-called field-weakening mode. This is attained by decreasing the DC current in the winding 19 of the second rotor 18 to a relatively low value or zero. At an extremely high vehicle speed, the stator field may be further decreased by reversing the DC current in the winding 19 of the second rotor 18.

To effect recuperative braking, the currents in the rotor winding 16 are set to zero and the load angle of the currents in the stator winding 12 is adjusted to such a value that the stator 10 exerts a braking torque on the second rotor 18. In this case electric energy flows from the stator winding 12, via the DC/AC converter 36, to the battery 38.

In the case that the battery is nearly full, a part of the electric energy may be directed to the first-rotor winding 16, via de DC/AC converter 34 and the brushes and sliprings 42. This results into a braking torque on the engine, and a part of the energy is dissipated in the engine.

Finally a pure electric drive can be realised. Now, the currents in the rotor winding 16 are set to zero and the load angle of the polyphase currents in the stator winding 12 is adjusted to such a value that the stator 10 exerts an accelerating torque on the second rotor 18. In this case electric energy flows from battery 38 to the stator winding 12, via the DC/AC converter 36.

When in pure electric drive a very high output torque is needed, the engine can be blocked mechanically and the first-rotor winding 16 can be supplied by a set of polyphase currents via the brushes and sliprings 42 and the DC/AC converter 34 from the battery 38. In this case, the first rotor operates as a kind of second stator which supports the action of the real stator.

Figure 7:
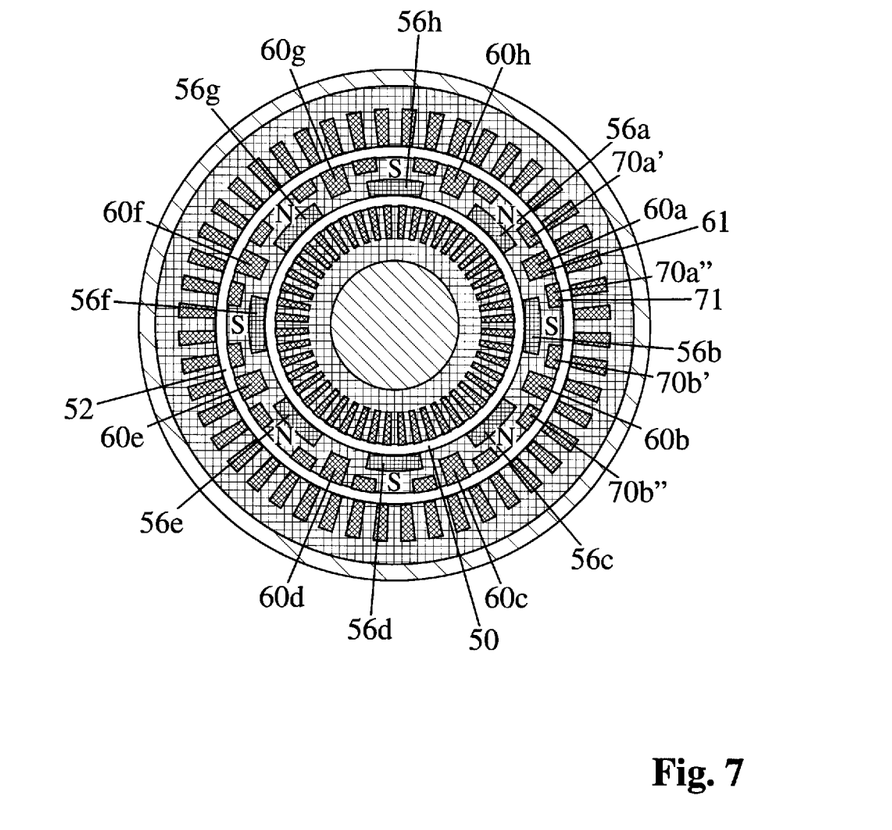
FIG. 7 a cross-section similar to the one shown in FIG. 2 of a somewhat different configuration of the control windings in the interrotor.

FIG. 7 shows the slots 60 with the windings 61 but this drawing also shows, in addition thereto, relatively shallow auxiliary slots 70a', 70a' with auxiliary windings 71 in an arrangement which comprises two such slots 70 enclosing one slot 60. In this way a different control of the flux distribution through the second rotor 18 and the stator 10 can be achieved.

FIG. 7 shows a symmetrical configuration but this is not strictly necessary—for certain operation modes a non-symmetrical configuration may be better.

The above described configuration is a radial-flux configuration. An axial-flux configuration is also possible. Such axial-flux configurations are commonly known in combination with an electromechanical converter which does not have the features of the invention. For instance WO 00-34066 (ABB) shows an electromechanical converter in an axial-flux configuration.

Figure 8:
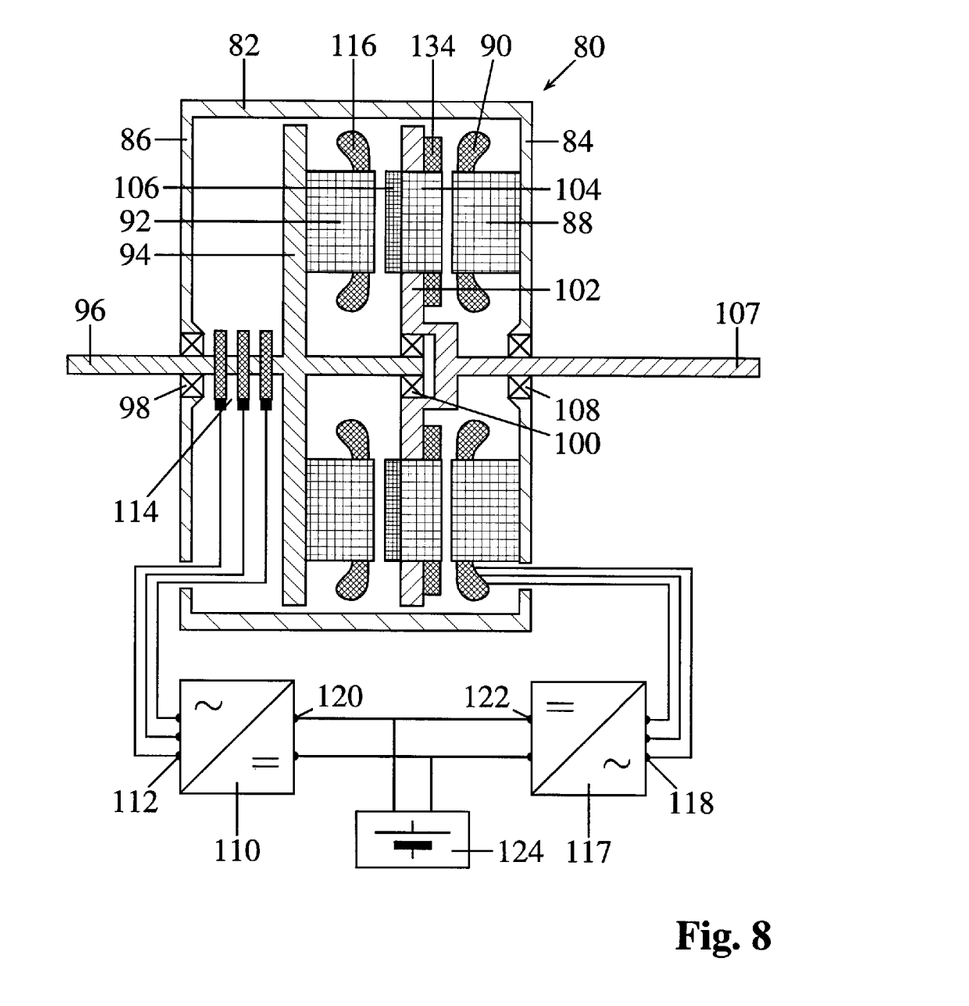
FIG. 8 a schematic cross-section of an electromechanical converter according to the invention in an axial-flux configuration.

FIG. 8 shows very schematically the general configuration of an electromechanical converter with axial-flux configuration in which the invention is incorporated.

The set-up comprises a housing 80 with a cylindrical wall 82 and the circular end walls 84, 86. The ring-shaped stator 88 is carried directly by the end wall 84 and is provided with the three-phase energizing winding 90. The first rotor 92 is carried by the disk 94 which is fixed to the input shaft 96 and this input shaft 96 is supported in a bearing 98 in the wall 86 and a second bearing 100 in the disk 102; the latter supports the second (inter)rotor 104 with the magnets 106, both in a ring-shaped configuration. The disk 102 carries the output shaft 107 which is supported in the bearing 108 in the end wall 84.

There is here, too, a first AC/DC converter 110 of which the AC terminals 112 are connected to the slip ring and brush assembly 114, co-operating with the winding 116 on the first rotor 92. The AC terminals 118 of the second AC/DC converter 117 are connected to the winding 90 of the stator 88. The DC terminals 120, 122 respectively are interconnected and connected to the battery 124.

Figure 9:
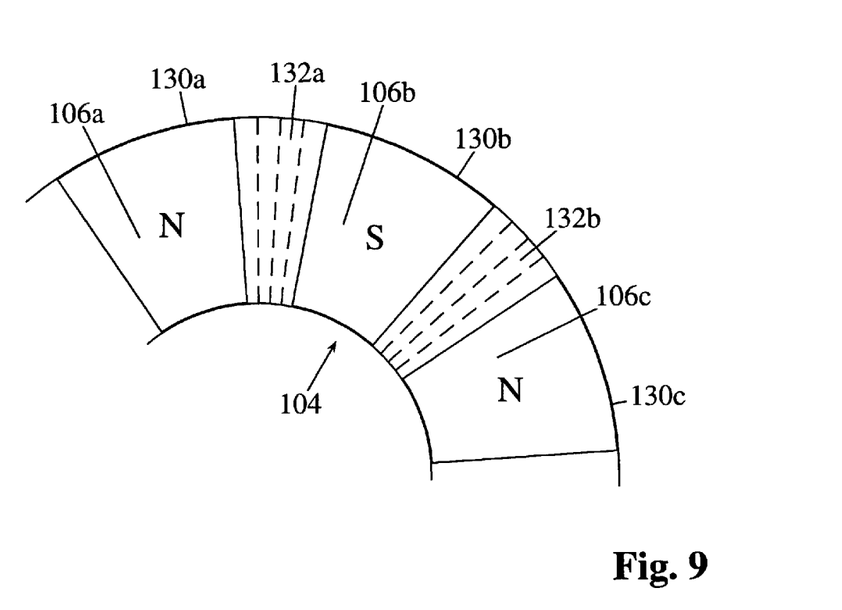
FIG. 9 a partial and schematic end view of the second rotor of this converter.
Figure 10:
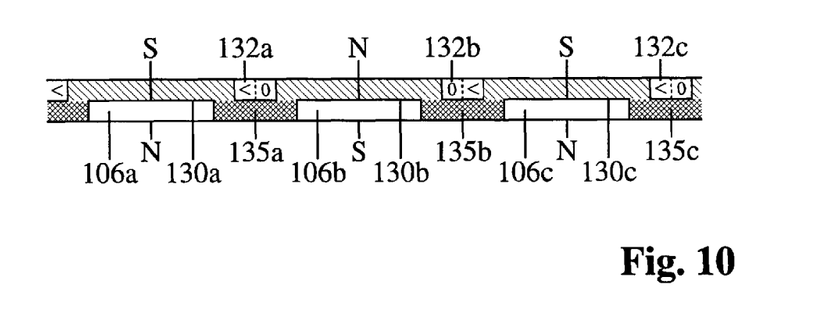
FIG. 10 a partial and schematic developed view of this second rotor.

FIG. 9 shows a partial and schematic side view of a possible embodiment of the second (inter)rotor 104 and FIG. 10 shows a developed view in a flat plane thereof. The rotor has a laminated structure. This structure is provided with cut-outs of which three are shown, indicated with 130a, 130b, 130c respectively. They accommodate the permanent magnets of which three are shown, indicated with 106a, 106b, 106c. The poles of these magnets alternate in the circumferential direction of the rotor. There are radial slots arranged around the rotor 104 of which three are shown and indicated with 132a, 132b, 132c—they accommodate the winding 134. The complete winding 134 is in fact a series connection of winding parts which each occupy one half of a slot and the adjacent half of the adjacent slot, such as indicated with the symbols '0' and '<'. The function of this winding 134 is the same as described above in connection with the winding 61 in the radial-flux embodiment and will thus not be described in more detail. This winding 134 must be fed with a controllable DC current via either an assembly of slip rings and brushes (not shown) or via a contactless assembly (AC fed energizing winding, pickup winding and rectifier)—such as known in itself and not shown either.

Beneath each slot there is in the magnetic material of the second (inter)rotor 104 a zone—of which three are shown—135a, 135b and 135c respectively (vide FIG. 10) which corresponds as to the function thereof with the zones 62 in the first radial-flux embodiment of the converter according to the invention as described above.

The way in which the magnetic fluxes emanating from the permanent magnets and penetrating into the stator 88 are controlled by the state of magnetisation of these zones is in principle the same as described in the above with respect to the radial-flux embodiment according to the FIGS. 1-7.

Figure 11:
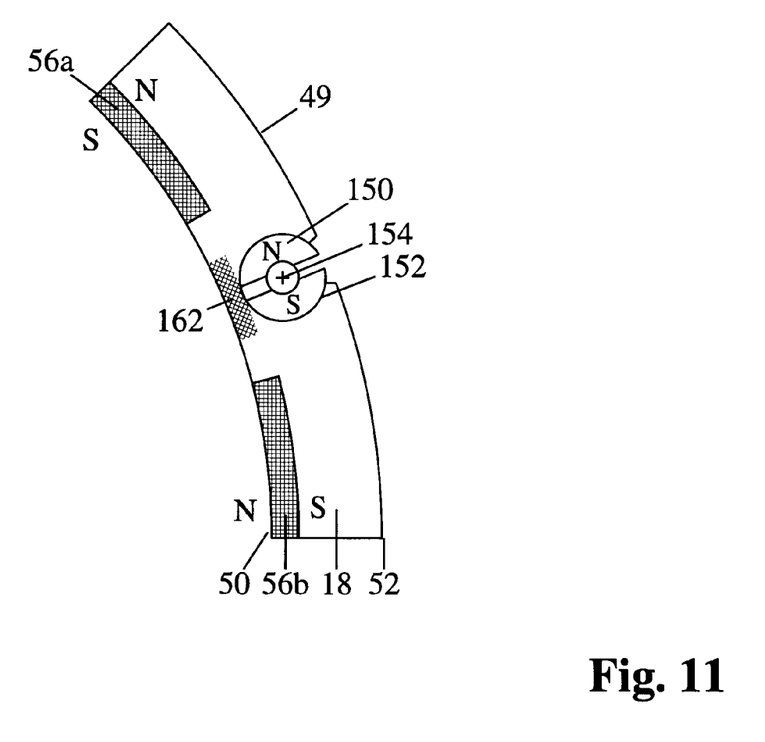
FIG. 11 in a cross-section similar to the one according to FIG. 3-6 an embodiment in which the magnetic state of the areas between the permanent magnets is modified by means of a number of permanent magnetic control members.

FIG. 11 shows schematically a part of the interrotor 18 in which the slots 60 with the winding 61 have been replaced by a number of elongated cylindrical control members 150 which are accommodated in suitable elongated slots 152 in the second (inter)rotor 18 in such a way that they can rotate around their respective axis 154. They are magnetised in a radial direction (or comprise a suitable number of discrete permanent magnetic members) such that they comprise a N pole and opposite thereto a S-pole. The orientation thereof with respect to the axis 154 influences the state of magnetisation of the areas between the permanent magnets 56a, 56b- here this area is indicated with 162. It will be appreciated that in the shown orientation of the member 150 the flux in this area 162 emanating from the magnets 56a, 56b will be reinforced while a rotation over 180° around the axis 154 will bring about a situation in which this flux is counteracted. An intermediate situation is of course possible. The respective members will in practice protrude with one end from the rotor 18 and co-operate with a suitable control mechanism for setting their orientation.

It will be clear that the above description only serves to elucidate the underlying principles of the invention and is not meant to show each and every part of a converter according to the invention and that many changes in, and variations of the shown embodiments are possible within the scope of the invention. So the second rotor can have a solid massive structure instead of the laminated structure as described above, and both the solid and the laminated structure can be reinforced by bolts. The slots which accommodate the energizing winding can be either closed or open.

The power electronics, such as the converters 34 and 36 and the controlling circuits can be constructed from commercially available components and the expert will not experience any problems in designing them. For instance control circuits as commercially used in combination with synchronous machines with permanent magnets can be used.

The invention claimed is:

1. A rotating electromechanical converter comprising at least the following elements, arranged around a common axis:
    a stator comprising magnetic circuits and polyphase energising windings;
    a first (inner) rotor at a distance from said stator and coupled to a first externally accessible shaft, comprising magnetic circuits and polyphase energising windings;
    a second (inter) rotor between the first rotor and the stator, coupled to a second, externally accessible, shaft, comprising magnetic circuits and permanent magnetic members for co-operation with the magnetic circuit of at least the stator such that a magnetic flux generated by these permanent magnetic members traverses both these magnetic rotor circuits and stator circuits; and
    means for modifying the state of magnetisation of at least a part of the respective second rotor areas which each lie between two successive permanent magnetic members.

2. The converter according to claim 1, further comprising said means for modifying the state of magnetisation comprising at least one externally accessible control winding for carrying a DC current, the arrangement of the permanent magnetic members and the control winding being such that the respective fluxes, generated by the permanent magnetic members and by the current in the at least one control winding share in the rotor at least one common magnetic circuit occupying at least a part of the respective interrotor areas between successive permanent magnetic members.

3. The converter according to claim 2, further comprising the control windings in the second (inter)rotor being connected via current rectifying means to a pickup winding which is electromagnetically coupled to an energising winding connected to a controllable alternating current source.

4. The converter according to claim 1, wherein said means for modifying the state of magnetisation comprises permanent magnetic control members which are adjustable as to the orientation of the magnetic poles thereof and are accommodated in the rotor in positions near to the areas between the permanent magnetic members.

5. The converter according to claim 1, wherein:
    the stator comprises a cylindrical configuration and surrounds via a first air gap the sleeve shaped second (inter) rotor which has a first outer surface directed towards the stator and a second outer surface directed towards first rotor, a second air gap being present between the second outer surface and the cylindrical first rotor;
    the permanent magnetic members each comprise a first pole directed to said first rotor and a second, opposite, pole directed to the stator, said poles having a first magnetic polarity and a second magnetic polarity respectively, said polarities alternating, in the circumferential direction, between adjacent poles; and wherein the converter further comprises;
        first magnetic circuits starting from each first pole and extending across the adjacent second air gap through the magnetic circuits of the first rotor back to each adjacent pole of opposite polarity;
        second magnetic circuits starting from each second pole and extending across the first air gap and through the magnetic circuits of the stator to each adjacent pole of opposite polarity;
        third magnetic circuits in the second rotor between adjacent poles of opposite polarity and extending in the circumferential direction of this rotor; and
        the second (inter)rotor comprises a control winding lying adjacent said third magnetic circuits to carry the controllable electrical DC current such that the magnetic fluxes generated by the current in said control winding are superimposed on the magnetic fluxes provided by the permanent magnetic members and passing through these third magnetic circuits and thereby control the magnetic flux density in at least the first magnetic circuits in the stator.

6. The converter according to claim 5, further comprising the control winding in the second (inter)rotor being accommodated in slots extending from the outer surface of the second rotor to the vicinity of the space between the permanent magnetic members in this rotor.

7. The converter according to claim 1, wherein:
    the stator comprises a cylindrical configuration and surrounds via a first air gap the sleeve shaped second (inter) rotor which has a first outer surface directed towards the stator and a second outer surface directed towards the first rotor, a second air gap being present between this second outer surface and the cylindrical first rotor;

the permanent magnetic members each comprise a first pole directed to the stator and a second, opposite, pole directed to the first rotor, said poles having a first magnetic polarity and a second magnetic polarity respectively, said polarities alternating, in the circumferential direction, between adjacent poles; and wherein the converter further comprises;

first magnetic circuits being present, starting from each first pole and extending across the adjacent first air gap through the magnetic circuits of the stator back to each adjacent pole of opposite polarity;

second magnetic circuits starting from each second pole and extending across the second air gap and through the magnetic circuits of the first rotor to each adjacent pole of opposite polarity;

third magnetic circuits in the second rotor between adjacent poles of opposite polarity and extending in the circumferential direction of this rotor; and the second (inter)rotor comprises a control winding, lying adjacent said third magnetic circuits to carry a controllable electrical DC current such that the magnetic fluxes generated by the current in said windings are superimposed on the magnetic fluxes provided by the permanent magnetic members and passing through these third magnetic circuits and thereby control the magnetic flux density in at least the second magnetic circuits in the first rotor.

8. The converter according to claim 1, further comprising:
the stator, the first rotor and the second rotor being each disk-shaped members arranged around a common axis; the stator and the first rotor each carrying an externally accessible polyphase energising winding in a ring-shaped configuration; and the second rotor being positioned between the stator and the first rotor and carrying at the surface thereof radially arranged permanent magnets in a ring-shaped configuration having poles of a first polarity directed towards the first rotor and poles of opposite polarity directed towards the stator, and carries furthermore either a control winding or permanent magnetic control members nearby the respective zones between the permanent magnetic members.

9. The converter according to claim 8, further comprising:
the stator, the first and the second rotor being accommodated in a cylindrical housing of which a first end wall carries in a bearing a first shaft to which the first rotor is connected; and the inner end of this first shaft is supported in a bearing in the centre of the second rotor, which rotor is connected to a second shaft supported in a bearing in the second end wall of the housing, which second end wall also carries the stator.

10. The converter according to claim 1, further comprising the field strength of the permanent magnetic members and the arrangement thereof being such that the respective areas between them being magnetically saturated in the absence of any current in any winding of the machine.

* * * * *